Figure 4:
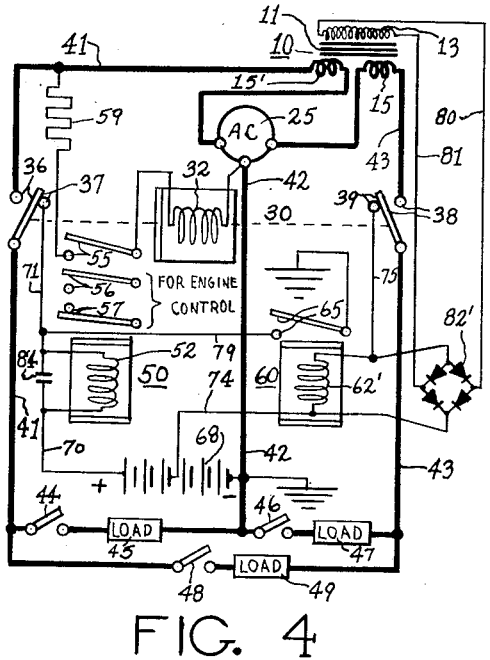

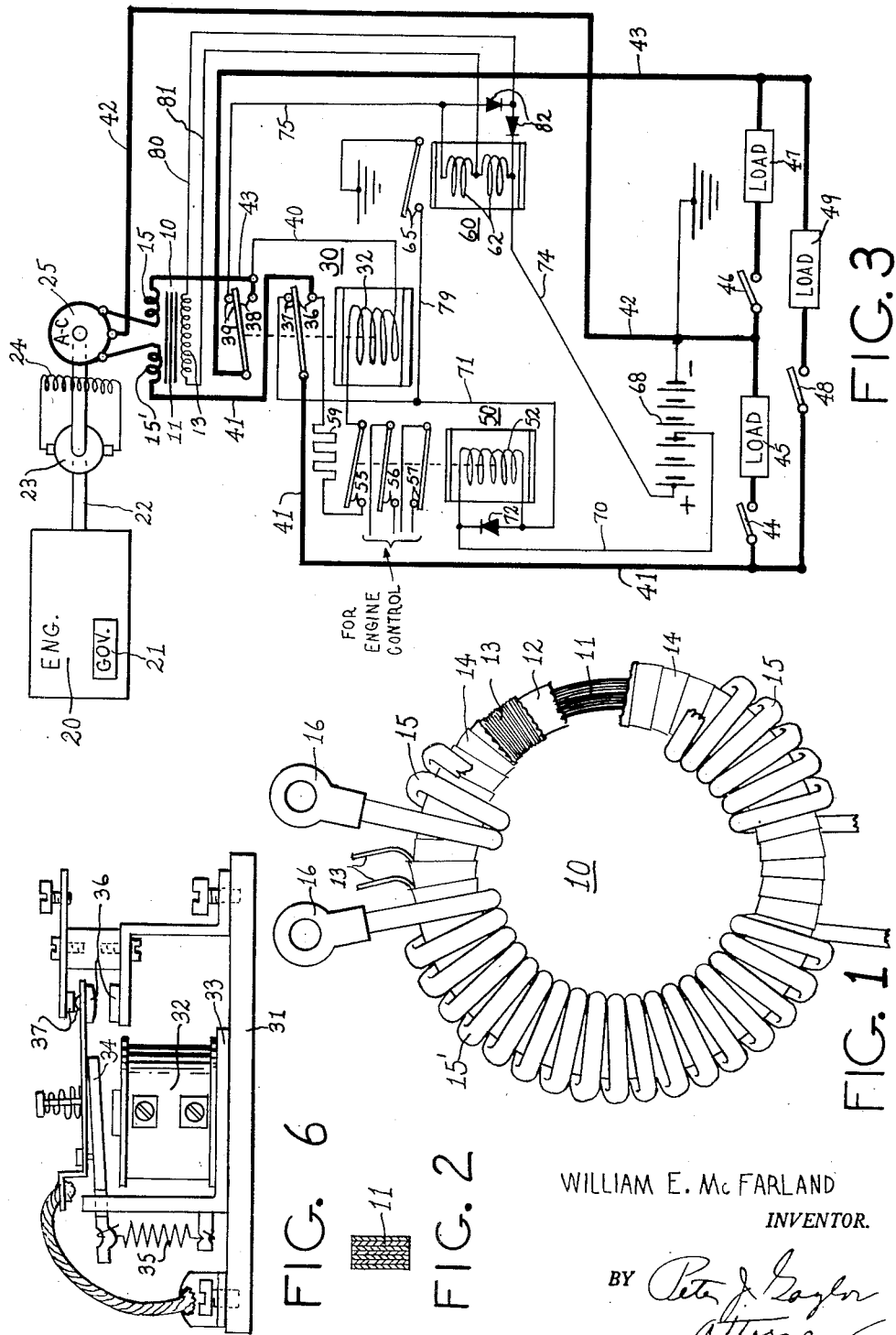

Nov. 26, 1957 W. E. McFARLAND 2,814,732
RELAY CONTROL SYSTEM FOR THREE-WIRE ENGINE-GENERATOR SETS
Filed June 25, 1956 2 Sheets-Sheet 2

WILLIAM E. McFARLAND
*INVENTOR.*

BY *Peter J. Taylor*
*attorney*

United States Patent Office

2,814,732
Patented Nov. 26, 1957

2,814,732

RELAY CONTROL SYSTEM FOR THREE-WIRE ENGINE-GENERATOR SETS

William E. McFarland, Nutley, N. J.

Application June 25, 1956, Serial No. 593,431

9 Claims. (Cl. 290—30)

This invention falls in the field of automatic relay control systems for effecting fully automatic control of small engine-generator sets in response to an intermittent load demand. Usually the requirement is to effect the automatic starting of the plant when even a small load is connected to any of the load circuits served by the plant, and to effect stopping of the plant when all loads are disconnected. In the case of engines provided with solenoid types of idling devices, there may be a selector switch provided, so that, upon termination of load, the engine will either be stopped or brought to a forced slow idling speed, depending upon the position of the selector switch. In such a case, whether the engine is entirely stopped or is merely idling, the relay control system will effect full speed operation when a new load is connected.

The initial load often is just one lamp or small appliance. Such a load condition requires a highly sensitive control system and the small load response requirement has made it impossible heretofore to provide suitably simple and rugged control relays.

The present invention is directed specifically to three-wire electric generating plants, such as three-phase installations, but more particularly, to the common 115–230 volt single-phase three-wire types. In the case of the latter types, the two "outer" wires of the 3-wire system provide a 230-volt load circuit. The "inner" or "center" wire usually is a grounded wire and, in combination with the outer wires individually, it provides two 115-volt load circuits. The center wire ordinarily is connected to the negative side of the starting battery. In order to obtain the necessary fully-automatic control, it has heretofore been necessary to provide two rather complex and delicate load-responsive relays, one associated with each of the outer wires. The initial response of one or both of these relays (upon initial connection of load) takes place through benefit of energization circuits taken from the 12 to 24-volt starting battery. The relay energization for initial response tends to be weak because the battery current must pass through the load appliance. In the case of the 230-volt load circuit, the battery current must pass through an operating winding of both load-responsive relays and, unfortunately, the full battery voltage is not available for the function of initial response. The load-responsive relays have been required to have separate operating windings for the battery energization and for the holding energization and, frequently, two separate armatures are employed in each relay, one for each energization winding. However, it is necessary that the battery energization be adequate to set both armatures in the energized position, as the holding winding ordinarily is not of sufficient force and effect to obtain the initial pull-in of any armature. Due to the weak effect of the usual holding winding, it is necessary that there be an overlapping between the battery and holding energizations. This means that the contactor relay (which is responsive to act upon accomplishment of sufficient engine acceleration) ordinarily is of the make-before-break type, so that the battery energization of the load-responsive relays is not cut off until an instant after the holding energization has become effective, the holding energization thereafter remaining effective during A. C. flow to the loads. Such make-before-break arrangement is a complicating factor since it adversely permits a momentary flow of A. C. through the battery windings of the load-responsive relays. A particular disadvantage of this momentary A. C. is that it prevents the possibility of utilizing a rectifier for the purpose of by-passing one of the battery-energized windings, as such a rectifier would be destroyed. By-passing one of the windings (with respect to the initial response in the 230-volt load circuit) would enable a desirable concentration of energization in just one of the two load-responsive relays, as contrasted to the prior art practice of dividing the limited battery energization between the two relays.

The system of the present invention dispenses with the coarse holding windings of the load-responsive relays. The holding energization in this case is obtained through use of a current transformer of particular construction to be hereinafter set forth, as well as one having one section of its primary winding connected in series with each of the two outer of the three wires or leads of the generator so that the transformer is made immediately operative by power flow in any or all the load circuits. The output of this transformer as suitably rectified, is utilized in a unique manner to energize only one load-responsive relay. Furthermore, there is preferably no separate holding winding incorporated in the energized load-responsive relay, since the same basic operating winding is suitable and simply used for both the battery energization and the transformer energization of the relay. This transformer is impedance-matched to the relay winding in a manner enabling pull-in energization of the load-responsive relay even under light load condition, and, at the same time, permitting cool operation of the relay winding under full-load condition. The necessity for make-before-break action on the part of the contactor is eliminated, thus enabling by-passing one of the load-responsive relay windings with respect to battery-energization, resulting in a much more positive initial energization of the other load-responsive relay winding when the initial load is one occurring in the 230-volt circuit. In the simplified modification of the invention, the necessity for the usual two load-responsive relays is eliminated, and one relatively small and simple load-responsive relay incorporating the two independent operative windings has been found sufficient to provide the necessary response for the two 115-volt power circuits, as well as for the 230-volt circuit.

Figure 5:
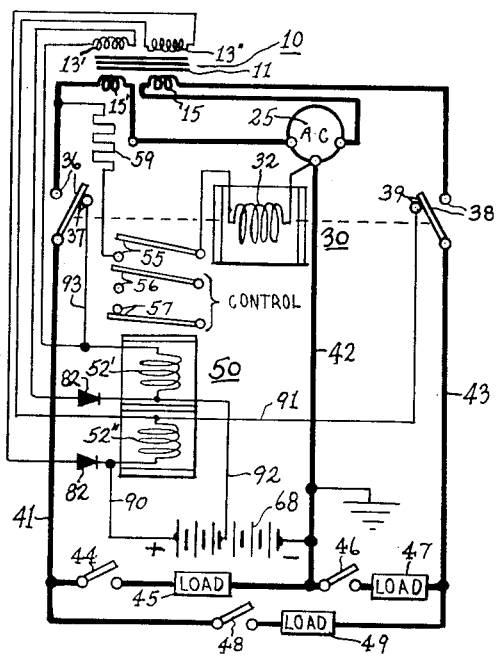
Figure 7:
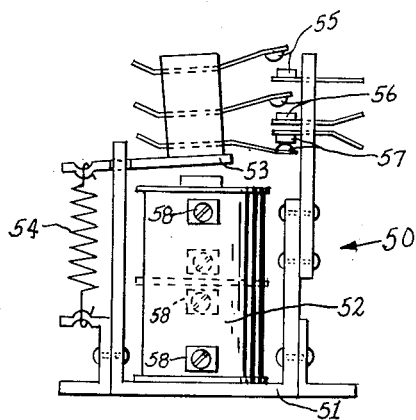

The present invention will be more readily understood by reference to the accompanying drawings in which Figure 1 illustrates a plan view of a preferred embodiment of a transformer employed in the present invention, while Figure 2 depicts a cross-sectional view of the core of the transformer of Figure 1. Figure 3 shows a circuit diagram illustrating circuit conditions encountered in the practice of the invention. Figures 4 and 5 illustrate modifications of circuit arrangements which may be employed in the practice of the invention. Figure 6 is a side view of a conventional contactor type of relay which may be utilized in the circuits of Figures 3, 4 and 5, while Figure 7 is a side view of a generally conventional inexpensive relay suitable to serve as a load-responsive relay in the practice of the invention. Similar numerals refer to similar parts in the various figures.

Referring again to Figure 1, there is illustrated a transformer serving as a current transformer and designated generally by numeral 10 and of a suitable type for the purposes of this invention. The practice of the invention requires a current transformer of particular specifications, as the core of the transformer is operated far beyond saturation. Basically, this transformer is designed for high efficiency when operating as a fractional-watt transformer to step up, say, less than one volt, to several volts. In general, the only concession from the fractional-watt design is that of providing sufficient core length to enable the use of a primary winding which, while having relatively limited mass, yet will satisfactorily enable passage of the load circuit current. Such transformers are more fully described in co-pending application Serial No. 589,467 filed on June 5, 1956 by William E. McFarland.

Transformer 10 has a "tape wound" core 11. A most suitable core material is a 50% nickel-iron alloy, such as that material known as "Deltamax," made by Arnold Engineering Co., Marengo, Illinois. This material is available in 0.002" and 0.004" tape ribbon form, and has a permeability of about 50,000 when magnetized just short of saturation with 60 cycle sinusoidal current, and the material saturates at approximately 14,000 gausses. The sectional area of the core may be quite small, as indicated by Figure 2. For example, a core 0.8 sq. cm. in cross-sectional area will carry, say, 11,000 lines of magnetic flux. The slender design of the core reduces core heating under conditions of extreme saturation and tends to permit the herein desirable large number of primary turns per unit of core length. A cover 12, such as one made of molded plastic, insulates core 11 from secondary winding 13 which is one of nominal mass. The turns of secondary winding 13 will be so selected as to obtain an impedance match between the transformer and the load-responsive relay, as will be described and, for usual conditions of use, 150 to 250 turns would be satisfactory, these having a resistance up to, say, 10 ohms. Insulation 14 covers the secondary winding.

The primary winding consists of a double section winding which includes the preferably identical sections 15 and 15'. If, for example, a 50-ampere load current carrying capacity is required for each section, the wire size would be of about No. 10 of either solid or flexible stranded wire. About 20 turns for each section will provide a suitable sensitive system, and to accommodate this number of turns, core 11 could have a mean length of about 8". The voltage drop encountered from the use of 20 turns of primary winding in each section will be quite small as compared to the voltage drop necessary for control purposes in systems used heretofore. Terminal clips 16 enable convenient connection to the main circuits.

Referring now to Figure 3, there is shown a schematic circuit comprising transformer 10 and other elements of the automatic relay control system. Only sufficient elements of the engine-generator set are shown to enable a clear explanation. The engine is indicated generally by numeral 20, and its governor by 21. Shaft 22 connects the engine to drive exciter generator 23 and the 3-wire A. C. generator 25. Shunt field 24 serves both generators. Detailed circuits and elements for stopping, starting (or possible idling the engine), are not shown, as it is well known that necessary elements are included in all fully-automatic electric plants and are of a nature to be properly controlled by simple switching action of a master relay.

A voltage-responsive contactor-type relay is indicated generally by number 30, and includes individual contacts 36, 37, 38 and 39. A relay generally suitable for this purpose is shown in Figure 6, and this relay may include an insulating base 31, operating winding 32, main iron frame 33, armature 34, and armature spring 35. Contacts 38 and 39 would not be visible in this side view of Figure 6. It will be observed that the contact arrangement is much simpler than a make-before-break arrangement as conventionally used in three-wire systems. The contact arrangement of the relay of Figure 6 is that illustrating the simplest version of double-throw contacts, and the contacts of the contactor relay utilized in the practice of this invention will function as two individual sets of single-pole double-throw contacts whether or not the contactor relay contacts follow closely the design details of Figure 6.

The three wires or leads from generator 25 are indicated as 41, 42 and 43, serving loads 45, 47 and 49 which may be connected by switches 44, 46 and 48, respectively, and, as will be understood to those skilled in the art, the load in any load circuit may be a small one at times and a large one at other times. The outer two wires or leads 41 and 43 are disconnected from generator 25 except during such periods as when contactor relay 30 is operatively energized. Transformer primary windings 15 and 15' are connected in series with leads 41 and 43, respectively.

Load-responsive relays 50 and 60 may be generally similar to each other, relay 50 being illustrated in Figure 7. This relay has a main frame 51, operating winding 52, armature 53, armature spring 54, and such normally-open and/or normally-closed contacts as may be needed. Terminals 58 are provided for making connections with relay operating winding 52 and, as indicated by the broken lines, operating winding 52 may be divided into two sections and provided with the required additional terminals. Contacts 56 and 57 are shown as elements of relay 50, and these contacts may be utilized to effect the starting and stopping of the engine in accordance with energization and de-energization of relay 50, respectively. Relay 50 also includes normally-open contacts 55. These contacts are connected in series with the energization circuit for winding 32 of voltage-responsive relay 30, which circuit starts from A. C. generator 25, then includes transformer winding 15', a portion of lead wire 41, then through resistor 59, contacts 55 when closed, winding 32, wire 40, lead wire 43, transformer primary 15, and returning to generator 25. Relay 30 thus can be operatively energized (to reverse the shown positions of its contacts) only when relay 50 also is operatively energized, and the energization of relay 30 also will not reach the operative stage until the voltage of generator 25 has risen closely to normal.

Relay 60 has normally-open contacts 65 which, when closed, assure energization of relay 50. This particular energization circuit for relay 50 begins from the center terminal of battery 68, the current passing through wire 70, winding 52, wires 71 and 79, contacts 65, and returning to the battery through ground.

Since relay 50 includes master control contacts 56 and 57, this relay must be energized from the initiation to termination of load connection. Transformer 10 provides the holding energization to one only of the load-responsive relays and, in the particular circuit of Figure 3, it is a matter of choice as to whether relay 50 or relay 60 is to be selected to receive the holding energization, relay 60 being shown as utilized in this case. Winding 62 is illustrated as having a center-tap which provides for an efficient rectifying circuit. Through means of wires 80 and 81, secondary winding 13 of transformer 10 is connected individually to each half of the center-tapped winding, the connections being such that each half of the winding would tend to be energized with current of opposite polarity. A half-wave rectifier 82, which is a plate-type rectifier such as a selenium rectifier, is connected in series with each half of winding 62, the rectifier polarities being such as to permit alternate energization of each half of winding 62, thus providing continuous energization of relay 60 so long as there is any appreciable output from transformer 10.

A three-wire fully-automatic electric plant requires three different battery circuits to insure initial response of a load-responsive relay. Battery 68 (which may be a 12–24 volt unit) has an intermediate terminal and two end terminals, one of which latter will be the positive terminal and the other the negative terminal. One of the end terminals necessarily is connected to center lead 42 and, in Figure 3, the negative end terminal is shown to be thus connected, but, since design details could be altered to permit the positive end terminal to be so connected to lead 42, the end terminal of the battery connected to the center lead of the generator may be referred to hereinafter as the first end terminal of the battery. The opposite terminal (which in Figure 3 is designated as the positive terminal) may likewise be referred to hereinafter as the second end terminal of the battery.

The battery circuit for load 45 is made effective by closing switch 44, this circuit starting with the intermediate terminal of battery 68, being through wire 70, winding 52, wire 71, normally-closed contacts 37, lead 41, load 45, and to the first end terminal of the battery which is illustrated as negative. The battery circuit for load 47 is made effective by closing switch 46, this circuit starting with the second end terminal of battery 68 (indicated as the positive terminal), thence through wire 74, through all of winding 62, wire 75, contacts 39, lead 43, load 47, and returning to battery negative.

Load 49 which is the load served by the outer leads from generator 25 presents a difficult problem in 3-wire electric plants. This circuit is made effective herein by closing switch 48, the circuit starting with the second end terminal of battery 68 (which is frequently only a 12-volt battery), thence through wire 74, through both halves of winding 62, wire 75, contacts 39, lead 43, load 49, lead 41, contacts 37, wire 71, rectifier 72, and wire 70, to the intermediate (6 volt) terminal of the battery. Rectifier 72 (which may be similar to rectifier 82) is of particular importance in this circuit, as the voltage drop across the rectifier will be of the order of only 0.5 volt and thus relay winding 52 is largely by-passed to concentrate the available energization in winding 62, thus providing energization of relay 60 which is quite adequate since relay 60 operates only one set of contacts. This by-passing expedient would not be applicable in three-wire control systems of the prior art in which the load-responsive relays are encumbered with coarse series windings and in which the make-before-break action of the contactor (substituting for present contactor 30) is required because of the weak energization provided by the holding windings. In the case of Figure 3, however, the battery energization of the load-responsive relays is adequate and efficient with respect to all three loads 45, 47, and 49, and there is no possibility of damage to rectifiers 72 or 82 because there is never any A. C. applied to these rectifiers, since contactor 30 is a break-before-make type of relay.

As has just been explained, closing of load switch 48 results in battery energization of relay 60. The resultant closing of contacts 65 assures the previously-described energization circuit for relay 50. It also happens that the closing of contacts 65 effects an incidental increase in the degree of energization of relay 60, but this, however, is of no consequence.

The full sequence of this operation of the system, assuming the engine to be stopped and relay positions to be as shown in Figure 3 is as follows: If the electric plant is a 115/230 volt unit, and the initial load is thrown on by closing of switch 48, relay winding 62 will be energized as last described above. Consequently, contacts 65 will be immediately closed to energize winding 52, and the contacts of relay 50 immediately will be reversed from the positions shown. The effect of the reversal of contacts 56 and 57 will be to start the engine and effect its acceleration toward governed speed in a manner known to those skilled in the art. Contacts 55 will close the energization circuit for relay 30, and this relay will pull in (upon voltage reaching a sufficiently high value following acceleration), thereupon reversing its contact positions, there being a slight switching interval due to the break-before-make design of relay 30.

Relay contacts 65, however, will not re-open during said brief switching interval, mainly because relay 60 does not lose the benefit of its battery energization instantly, especially when rectifiers 82 tend to prevent an instant breakdown of the energization of relay 60. If, however, the switching interval became unduly long, as due to sluggish action of relay 30, relay 60 might drop out and, in turn, relay 50 might drop out. The resulting opening of contacts 55, however, would cut off the energization of relay 30, permitting a re-seating of the normally-closed contacts 37 and 39 of this relay. Thus, a momentary restoration of the battery circuit takes place and a new opportunity is afforded for a normally-fast switching operation on the part of relay 30. Thus, at least after one or two false starts, a quick switching operation will be effected by relay 30, whereupon all relay positions will be reversed from those positions illustrated in Figure 3 so that 230-volt A. C. will flow to load 49, and, in turn, transformer current will hold relay 60 energized. Through closed contacts 65, relay 50 will remain energized, and the governed speed status of the engine will continue. The transformer energization of relay 60 will be terminated when all load is disconnected from all load circuits, resulting in the resetting of relay elements to positions as depicted in Figure 3. The current drawn by winding 32 produces a very slight output from transformer 10, but this, alone, is insufficient to operatively energize relay 60. Therefore, relay 60 drops out when all loads are disconnected and, in turn, relay 50 is de-energized, resulting in the stopping of the engine, or at least in the idling down of the engine according to the desired predetermined operation of the particular system.

The sequence of operation will be identical to that described above when load 47 is the initial load. The sequence of operation is only slightly different from the foregoing when load 45 is the initial load. In such instance, relay 50 is directly energized by the battery circuit, already described, to effect the starting and acceleration of the engine. Relay 30 will provide its switching action as acceleration nears completion, and this terminates the battery-energization of relay 50. However, the load A. C. will start flowing and the transformer will provide current to effect the pull-in energization of relay 60 which, through closing of its contacts 65, establishes a continued energization of relay 50, and insures continuous governed-speed operation.

The advantages of the system of Figure 3 are that the relays may be of a simple, rugged, inexpensive type, and the operation of the relays is forceful. Furthermore, the battery energization is adequate with respect to all three loads 45, 47 and 49. While this arrangement of Figure 3 is unique in several respects, the successful operation of the system is greatly dependent upon obtaining a particular type of output from transformer 10 so that adequate holding energization will be provided to relay 60 under conditions of very small loads and also so that relay 60 and rectifiers 82 will not suffer overheating damage under conditions of heavy loads.

The details of operation of the system, particularly with respect to transformer operation, of the present invention are as follows: Transformer 10 already has been described. Relay 60 may be a small control relay and, for example, its winding 62 may be an inch in diameter and somewhat over an inch long, and it is wound upon a small core. The D. C. resistance of winding 62 should be of the order of 150 ohms to enable efficient energization of this load-responsive relay winding by the battery current. The impedance of such a winding, with respect to rectified but unfiltered current, will be only reasonably greater (in ohms) than its D. C. resistance, assuming that the rectified current is of reasonably normal wave form, such as sinusoidal. Assuming the D. C. resistance of winding 62 to be chosen, for example, as 150 ohms, the number of turns of secondary winding 13 are specifically chosen so as to obtain the operative energization of relay 60 under the condition of a very small current flow through the primary winding of the transformer, such as the current flow through the smallest load that would be connected as initial load. Within limits, the progressive reduction of the number of secondary turns permits operative energization of relay 60 with progressively less current through primary windings 15 or 15', but, if too many secondary turns are removed, relay 60 could not be operatively energized at light-load condition or any other condition except by adjusting relay 60 for very sensitive operation. On the other hand, the use of too many turns of secondary winding will result in failure to obtain operative energization of relay 60 at light-load condition and also result in excessive or at least higher-than-useful degree of energization at full load condition.

The procedure of determining the proper number of turns for secondary winding 13, so as to obtain operative energization of relay 60 under very light-load condition, involves the obtaining of a condition of efficient impedance-match between the transformer and relay winding 62 at some very small value of load circuit current flow, as compared with maximum flow. This means that there will be some point quite low in the range of possible load circuit current flow at which either an increase or a decrease in the number of secondary turns would result in a weaker energization of relay 60. The particular condition at the point of proper impedance-match is such that the transformer core is operated in an extremely high magnetization range, considering that an extremely low current is flowing through the transformer winding. This condition, however, enables a voltage input for the transformer that is significantly high, considering that transformer 10 is a current transformer operating at the lower end of its range; and the benefit of the high voltage input is only partially offset by core losses which are incurred by operating in such a high magnetization range. Thus, an increase in the number of secondary turns would reduce the voltage drop (input) appearing across the primary winding and this would not be offset by the resultant benefit of lower core loss through working the core in a lower magnetization range. Likewise, a decrease in the number of secondary turns would provide the benefit of a still larger voltage drop (input) appearing across the primary winding, but the core loss would be increased so that the actual output of the transformer would be less than that at the point of impedance-match. The number of secondary turns for a suitable impedance match is influenced greatly by the particular quality of the transformer core employed. In general, the core should be worked near or within its best permeability range at the point of impedance match, and this impedance match must be made at a sufficiently small value of circuit current flow that the transformer tends to be worked at full saturation at least quite reasonably near the lower end of the range of load circuit current flow.

When such a suitable transformer is provided and the proper impedance match is obtained, based on a low value of circuit current flow, relay winding 62 is never excessively energized. The wave form of the transformer output is highly peaked during ordinary load circuit current flow and is particularly peaked at maximum load circuit flow, but the pulses of voltage produced by the transformer are very brief indeed, and since relay winding 62 has an extremely high impedance with respect to the wave form produced by the transformer, relay winding 62 thus becomes self-protective, and relay 60 merely remains adequately energized when high peak voltages are produced by transformer 10.

Under this condition of high peak voltage generation in secondary winding 13, there will be a certain amount of reverse or leakage current flowing through rectifiers 82, since the peak voltage applied to the rectifiers will be higher than the normal rated voltage of the rectifiers. It is not practical to use rectifiers of sufficiently high voltage rating to substantially resist the leakage current, since in such case the rectifiers would be inefficient and relatively inoperative with respect to enabling energization of relay 60 at the point of impedance match. The leakage current tends to heat the rectifiers to a moderate degree, which is not serious, and which merely prevents the use of normally-small rectifier cells which otherwise might be permissible.

It will now be obvious that when current flow through transformer primary windings 15 or 15' is quite small, that the transformer is operating similarly to a conventional, very small, voltage transformer, i. e., the core is operating somewhere in the intermediate or high magnetization range which permits an unusually significant transformer output, considering that the transformer is a current transformer operating at the low end of an extremely wide range. The relatively powerful and uniform holding energization provided by transformer 10 greatly simplifies the design of the load-responsive relays for a three-wire electric plant, and the load-responsive operating windings of the load-responsive relays may be designed almost exclusively with the objective of obtaining efficient response to the battery circuit energization, since the holding energization (as provided by the transformer) does not conflict in any way with the battery energization.

Figures 4 and 5 represent modified circuits and elements of the invention. In these diagrams the contacts of relay 30 have been positioned to more simply illustrate the circuit. In Figure 4, load responsive relay 60 is provided with an operating winding 62' which is not a center-tapped winding, and a conventional bridge circuit rectifier 82' is used, this being an acceptable rectifier arrangement. Rectifier heating will, however, be more noticeable in the circuit of Figure 4, since leakage current can pass directly through the rectifier without pasing through relay winding 62'.

Also, in Figure 4, the battery connections are shown to be reversed, as compared to those in Figure 3, i. e., the second (positive) terminal of the battery is shown connected to load-responsive winding 52 of relay 50 rather than to load-responsive winding 62' of relay 60. In the event the initially-connected load is load 49, the battery circuit, starting with the positive terminal, is through wire 70, winding 52, contacts 37, lead 41, load 49, lead 43, contacts 39, wire 75, rectifier 82', and to the intermediate terminal of the battery. This circuit results in the energization of relay 50, while largely by-passing relay winding 62', and it will be observed that in Figure 4 it is not necessary to specifically add a rectifier to the structure for the by-passing purpose since rectifier 82' provides the by-passing as an incidental function. The operation will be generally equivalent to that described for Figure 3, as the load-responsive operative windings of one or the other relays 50 or 60 will be battery-energized when an initial load is connected, and thus energization of relay 50 is assured to effect starting of the engine, as well as acceleration. Upon sufficient acceleration, contactor relay 30 will undergo its switching operation, after which A. C. will flow to the load and the holding energization, will be provided by the output of transformer 10, to relay 60. This action, in turn, through closing of contacts 65, assures the energization of relay 50 until all loads are disconnected. A condenser 84 is shown as being connected across the terminals of relay winding 52, and it tends to prevent drop-out of relay 50 during the brief switching interval required for the switching operation effected by relay 30.

Figure 5 illustrates a simplified circuit for control of a three-wire plant. Relay 60 is omitted, and relay 50 is provided with two load-responsive operating windings 52' and 52" which are not connected with each other and this enables relay 50 to be directly responsive to an initial load connected in any load circuit, as will be described. The holding energization could be applied through a bridge rectifier (such as rectifier 82') as in Figure 4, in which case it would only be necessary to energize one of the windings, say winding 52'. The half-wave rectifiers 82, however, have a lesser adverse effect with respect to the initial battery energization of relay 50. The use of these rectifiers necessitates the use of two (duplicate) secondary windings 13' and 13" on transformer 10, merely in order to preserve the isolation of relay windings 52' and 52".

With respect to load 47, the initial energization circuit is from the positive (say 12-volt) terminal of battery 68, through wire 90, winding 52", wire 91, contacts 39, lead 43, load 47, to the negative battery terminal which necessarily results in operative energization of relay 50. Likewise, the circuit for load 45 is from the intermediate terminal of the battery, through wire 92, winding 52', wire 93, contacts 37, lead 41, and load 45 to the negative terminal, thereby assuring pull-in of relay 50.

With respect to load 49, the initial circuit is from the positive terminal of battery 68, through wire 90, winding 52", wire 91, contacts 39, lead 43, load 49, lead 41, contacts 37, wire 93, transformer secondary 13', upper rectifier 82, and returning through wire 92 to the intermediate battery terminal. Winding 52" thus is energized, while winding 52' is not appreciably energized because practically all the current is by-passed through the low resistance path which includes one rectifier 82 and secondary winding 13'. Such slight current as does flow through winding 52' is in opposed polarity to the energized winding 52", but relay 50 is effectively energized. At such time as the engine has started and accelerated and thus resulted in effecting the switching action of relay 30, the holding energization of relay 50 will become immediately effective, and the character of engine control will be equivalent to that in the other figures. It will be apparent that the particular advantage of the circuit in Figure 5 is that the number of working parts are reduced to the bare minimum, thus tending to simplify the proper adjustment and maintenance of the control system. It is true, however, that the battery energization of the two individual operating windings 52' and 52" of the load-responsive relay system of Figure 5 is less forceful than for the comparable individual operating windings 52 and 62 of Figure 3, particularly because windings 52' and 52" each necessarily occupy only half the available core length of relay 50 and, for a given resistance, do not provide the same ampere turns as the full length windings 52 and 62. The simpler Figure 5 structure is, however, adequate for many conditions, and would be fully-sensitive in operations where higher battery voltages can be made available.

Upon consideration of Figures 3, 4, and 5, it will be apparent that it will be optional whether the load-responsive relay system of the present invention comprises two or only one load-responsive relay and, in the event that two such relays are employed, that the transformer holding energization is required to be applied to only one of them. Also, regardless of whether one or two of such relays are employed, there always must be two battery-energizable load-responsive relay windings, one of which is permanently-connected in series with one end terminal of the battery, which may be designated as the second end terminal of the battery, and this one winding will be connected with one of the outer generator leads (which may be designated as the first outer lead) when voltage-responsive relay 30 is de-energized. Similarly, the other of the two windings is permanently connected in series with the intermediate terminal of the battery and this other winding will be connected with the other outer lead (which may be designated as the second outer lead) when voltage-responsive relay 30 is de-energized.

The description with respect to Figures 3, 4 and 5 has been on the assumption of a 115/230 volt three-wire electric plant. These figures and description would serve equally well for a system applied to three-phase electric plants, in which case loads 45, 47, and 49 all would represent single-phase loads and, under most conditions of application, the system as described will operate satisfactorily for such three-phase electric plants.

I claim:

1. In a relay control system for automatically starting a 3-lead A. C. engine-generator set having a starting battery, said leads consisting of a first and a second outer lead and a center lead which latter is connected to a first end terminal of said battery, and having a voltage-responsive contactor relay including an operating winding, said relay having a set of single-pole double-throw contacts associated with each of said outer leads, said relay also being constructed and arranged so that when said engine is stopped, the relay becomes de-energized and said contacts are positioned to disconnect both outer leads from said generator and simultaneously connect the first outer lead with the second end terminal of said battery through a hereinafter-mentioned first load-responsive relay operating winding and also connect said second outer lead with an intermediate terminal of said battery through a hereinafter-mentioned second load-responsive relay operating winding, thereby establishing battery-powered winding-energization circuits at least one of which will be made operable by connection of a load between any pair of said three leads, and, when upon acceleration of said engine, said contactor relay becomes energized and said contacts then being positioned to interrupt said battery circuits and to connect said two outer leads with said generator, the improvement comprising the inclusion in said relay control system of a load-responsive relay system having at least one load-responsive relay, and having switching contacts arranged at one status to effect said starting of the engine and at another status to effect said stopping of the engine, said load-responsive relay system including a current transformer having a double-section primary winding, each section of which is connected in series with a different said outer lead, and including rectifying means and also including at least two load-responsive relay operating windings two of which are battery-energizable, the first of which two is permanently connected in series with the second end terminal of said battery and is arranged to be connected as aforesaid with said first outer lead when said voltage-responsive relay is de-energized, said second operating winding being permanently connected in series with said intermediate terminal of the battery and arranged as aforesaid to be connected with said second outer lead when said voltage-responsive relay is de-energized, said load-responsive relay operating windings being arranged so that energization of either will effect actuation of said switching contacts at said one status to enable starting of the engine, said transformer having at least one secondary winding connected through said rectifying means to at least one operating winding of only one load-responsive relay in a manner such that a holding energization will be effected to hold said switching contacts at said one status for governed speed engine operation until all loads have been disconnected from all load circuits, said transformer having a high-permeability core and being impedance-matched, to said load-responsive relay operating winding which it energizes, at a point of very small load circuit current flow in a manner so that optimum energization of the relay winding is effected thereat, said transformer core being operated well beyond the point of saturation when a large load circuit current is flowing.

2. A relay control system according to claim 1, in which said rectifying means includes a rectifier connected across the terminals of said second relay operating winding which is permanently connected in series with the intermediate terminal of said battery, said rectifier having a polarity adjusted so that when the initially connected load is a load connected between said two outer leads, the battery current is by-passed with respect to said second relay operating winding, whereby the battery current energization is concentrated in said first relay operating winding which is permanently connected in series with said second terminal of said battery.

3. A relay control system according to claim 2, in which said second relay operating winding is connected with one secondary winding of said transformer for application of transformer holding energization to said second relay operating winding, and in which said latter rectifier is arranged to rectify the transformer current applied to said winding and also arranged to by-pass said battery current.

4. A relay control system according to claim 1, in which said transformer secondary winding is connected through said rectifying means to at least one of said first and second battery-energized load-responsive operating windings in a manner such that said holding energization will be effected to hold said switching contacts at said one status for governed-speed engine operation.

5. A relay control system according to claim 1, in which said load-responsive relay system includes only one load-responsive relay, said latter relay including said switching contacts arranged at one status to effect said stopping of the engine, and in which both said first and said second battery-energizable load-responsive relay windings are incorporated in said one load-responsive relay.

6. A relay control system according to claim 5, in which said transformer has two secondary windings, and in which said rectifying means comprises two individual rectifiers, each one associated with a different secondary winding, and in which one of said two secondary windings is connected through one of said rectifiers to said first battery-energizable load-responsive relay winding and the other of said two secondary windings is connected through the other said rectifier to said second battery-energizable load-responsive relay winding in a manner such that a holding energization will be effected to hold said switching contacts at said one status for governed speed engine operation until all loads have been disconnected from all load circuits.

7. A relay control system according to claim 6 in which each rectifier comprises a half-wave rectifier.

8. A relay control system according to claim 1, in which said load-responsive relay system includes two individual load-responsive relays, and in which said first battery-energizable load-responsive relay winding is included in one of said load-responsive relays for its energization thereof and the second battery-energizable load-responsive relay winding is included in the other of said load-responsive relays for its energization thereof, and in which only one of said two load-responsive relays includes said switching contacts arranged at said one status to effect starting of the engine, and in which the load-responsive relay other than the said only one includes a switching contact arranged to effect direct battery-energization of said only one load-responsive relay whereby said only one load-responsive relay is energized when said other than said only one load-responsive relay is energized.

9. A relay control system according to claim 8 in which the transformer secondary winding is connected through said rectifying means to at least one operating winding of only said load-responsive relay other than said only one relay in such a manner that a holding energization will be effected whereby direct battery-energization for said only one load-responsive relay will be made effective so that the switching contacts of said only one load-responsive relay will be held at said one status for governed speed engine operation until all loads have been disconnected from all load circuits.

References Cited in the file of this patent
UNITED STATES PATENTS

| | | |
|---|---|---|
| 1,704,996 | Witzel | Mar. 12, 1929 |
| 2,006,524 | Strong | July 2, 1935 |
| 2,611,877 | Walters | Sept. 23, 1952 |